G. BLUMBERG & J. A. BUTKUS.
ELECTRIC MOTOR.
APPLICATION FILED OCT. 13, 1915.

1,227,571.

Patented May 29, 1917.

Inventors
Gustav Blumberg
and John A. Butkus.
by Wilkinson & Early.
Attorneys

UNITED STATES PATENT OFFICE.

GUSTAV BLUMBERG AND JOHN A. BUTKUS, OF BALTIMORE, MARYLAND.

ELECTRIC MOTOR.

1,227,571.   Specification of Letters Patent.   Patented May 29, 1917.

Application filed October 13, 1915. Serial No. 55,685.

*To all whom it may concern:*

Be it known that we, GUSTAV BLUMBERG and JOHN A. BUTKUS, citizens of the United States, residing at Baltimore, in the State of Maryland, have invented certain new and useful Improvements in Electric Motors; and we do hereby declare the following to be a full, clear, and exact description of the invention, such as will enable others skilled in the art to which it appertains to make and use the same.

Our invention relates to electric motors.

The object of our invention is to produce a motor which can run on direct currents and also on alternating currents of any number of cycles per second within the limits of frequency used in the commercial distribution of electric power.

In carrying out our invention we use an armature having a Siemens type of winding and we mount this armature to revolve within a peculiarly constructed field magnet which is so constructed as to obviate the necessity for a field magnet coil.

A further object of our invention is to provide means for readily reversing the direction of rotation of the armature of our improved electric motor without the use of a reversing switch, thereby greatly simplifying any power installation in which it is necessary for the direction of rotation of the armature to be reversed. These and other objects and advantages of our improved construction will be set forth in the annexed specification, reference being had to the accompanying drawings.

In the drawings:—

Figure 1:
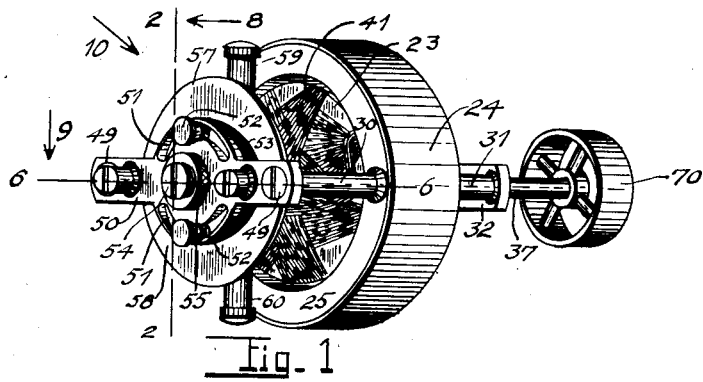
Figure 1, is a perspective view of our improved electric motor.
Figure 4:
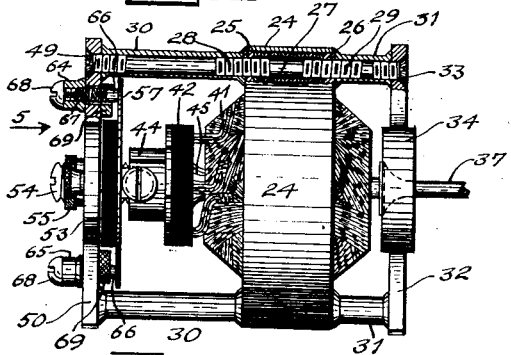
Fig. 4, is a top plan view of our improved motor, parts thereof being shown in section.
Figure 5:
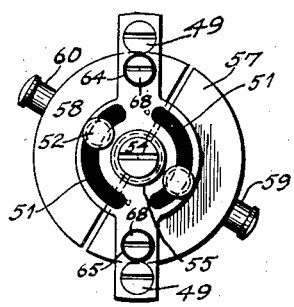
Figures 6, 7:
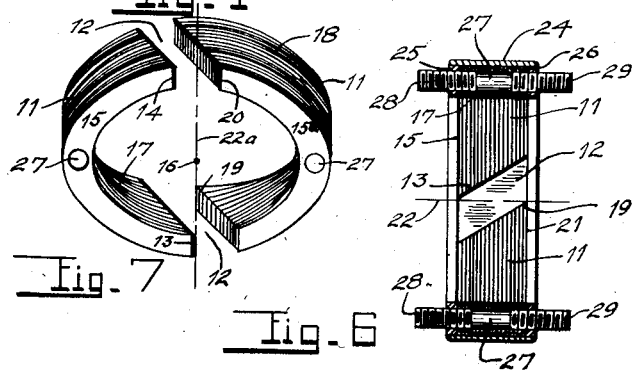

Fig. 5, is a front view of the motor as shown in Fig. 4, looking in the direction of the arrow 5, the field magnet being omitted and the brush holders 59 and 60 being moved somewhat in a clock-wise direction from the position shown in Fig. 4;

Fig. 6, is a section of the field magnet on a plane passed through the line 6—6 in Fig. 1, looking in the direction of the arrow 9; and Fig. 7, is a perspective view of the magnetic portion only of the field magnet of our improved electric motor as it would be viewed in the direction of the arrow 10 in Fig. 1, if the armature, bearings and diamagnetic rings and casing hereinafter referred to were removed from said magnetic portion.

In the drawings:—

11 represents the magnetic portion of our improved field magnet. Said magnetic portion 11 is composed of a plurality of laminæ which are originally formed in the shape of a flat ring. A plurality of the said flat rings are assembled together to form a hollow cylinder of the width shown at 11—11 in Figs. 2 and 6. After said laminæ are assembled to form the hollow cylinder as just described, we preferably solder the laminæ together. We then cut two slots 12—12, diametrically opposite each other, through the laminæ forming the magnetic portion 11.

The slots 12—12 are angularly disposed with reference to the axis of the magnetic portion 11 and both slots are cut at the same angle to said axis as shown in Fig. 7.

Referring to Fig. 7, the juncture 13 of the left hand face of the lower slot 12 with the end 15 of the left hand portion 11 is in line with the center of curvature 16 of the interior surface 17 and exterior surface 18 of the magnetic portion 11. The juncture 19 of the right hand face of the lower slot 12 with the end 21 of the right hand portion 11 is in line with the center of curvature 16 of the interior surface 17 and exterior surface 18 of the magnetic portion 11. It will also be noted with reference to Fig. 6, that the junctures 13 and 19 lie on a line such as 22 which is parallel to the axis of the magnetic portion of the field of our motor. The junctures 14 and 20 of the sides of the upper slot 12 with the faces 15 and 15ª are equidistant from the line 22ª which passes through the juncture 13 and the center of curvature 16.

The circumferential width of the slots 12—12 are approximately four-fifths of the circumferential width of one tooth such as 23 of the core of the armature. The object of this relation between the circumferential widths of the slots 12 and teeth 23 is to prevent any great change in the magnetic flux when the tooth is passing a slot 12. For the same reason the slots 12 are angularly disposed as shown, and it is evident that the angles which the slots 12—12 make with the axis of the magnetic portion 11 is determined by the width of said slots and the length of the cylinder which forms the magnetic portion 11.

After the magnetic portions 11—11 are formed as just described, they are fitted into a copper casing such as 24 and two copper or brass rings 25 and 26 are fitted snugly within the casing 24 against the ends of the magnetic portions 11—11. The inside diameter of the rings 25 and 26 is substantially equal to the inside diameter of the magnetic portions 11—11.

It will thus be noted that the field magnet of our improved motor consists of the paramagnetic portions 11—11 and a diamagnetic portion of high conductivity consisting of the casing 24 and rings 25 and 26.

After the field magnet is formed as just described, two threaded holes, one of which is shown at 27 in Fig. 4, are provided diametrically opposite each other in the magnetic portions 11—11 and rings 25 and 26, and stud screws, two of which are shown at 28 and 29, are screwed into said holes and supports 30—30 on the front and 31—31 on the rear are screwed on the studs similar to 28 and 29 respectively at the front and rear of our improved motor.

A bracket such as 32 is screwed to the studs 31 by screws, one of which is shown at 33 in Fig. 4. The bracket 32 has an enlarged central portion 34 in which is provided a raceway for balls such as 35. The balls 35 serve to support and center the cone 36 formed integrally with the shaft 37 of the armature of our motor.

The armature of our improved motor consists of a plurality of laminæ which are mounted in any approved manner upon the shaft 37 and said laminæ are provided with circular holes such as 38 which are joined with slots such as 39 that extend inwardly from the outer surface of said laminæ, whereby teeth such as 23 are formed.

Figure 3:
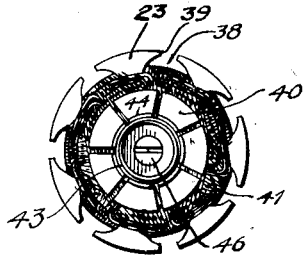
Fig. 3, is an end view of the commutator and armature.

It will be noted by reference to Fig. 3, that we provide an armature with seven teeth such as 23. The number of teeth is not limited to seven, it may be three, seven, nine, eleven or any odd number. We prefer to use an odd number of teeth such as 23 with the corresponding odd number of holes such as 38, and a corresponding number of commutator segments in preference to using an even number, because we find that by the use of an odd number of such parts all danger of the existence of a dead point is eliminated.

The armature is wound with any approved form of drum winding 41 such as a winding of the Siemens type and the terminals of the sections of said winding are connected in any approved manner to sections such as 40 of any approved form of commutator.

The commutator is formed of a plurality of sections such as 40 equal in number to the number of holes 38 in the armature core. The sections 40 are formed with a flange portion which is secured to the insulating disk 42 and the latter is mounted, as hereinafter described, upon the shaft 37. The disk 42 is formed integrally with a cylindrical flange 43 which extends under the cylindrical portions 44 of the commutator sections as shown in Figs. 2 and 3.

Figure 2:
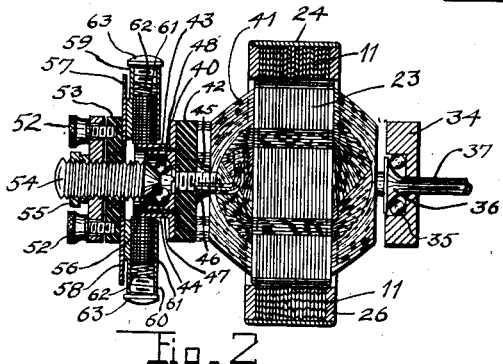
Fig. 2, is a vertical central section of the field magnet, commutator, bearings, brush holders, and brush holder supports on a plane passed through the line 2—2, and looking in the direction of the arrow 8 in Fig. 1.

The front end of the shaft 37 is enlarged as at 45 as shown in Figs. 2 and 4, and a central threaded hole is provided in said enlarged portion in which fits the screw 46.

Fitting the inside of the flange 43 there is mounted a raceway 47 in which revolves the balls 48, the screw 46 passing through a central hole in said raceway 47 serves to keep the latter and the disk 42 screwed to the shaft 37.

Secured to the supports 30—30 by the screws 49—49 is the bracket 50. The bracket 50 is provided with two arcuate slots 51—51 through which freely pass the screws 52—52, the inner end of said screws fitting in threaded holes povided in the insulating disk 53. The insulating disk 53 is revolubly mounted upon the screw 54 which pass through a threaded hole in the bracket 50, said hole being in line with the shaft 37. A lock nut 55 secures the screw 54 in any desired position. The rear end of the screw 54 is chamfered as at 56 and said chamfered portion bears against the balls 48. Hence, it is evident that the end-play of the shaft 37 may be made of any suitable amplitude by adjusting the screw 54.

Plates such as 57 and 58 are secured to the insulating disk 53 in any approved manner, and brush holders such as 59 and 60 are secured in any approved manner to said plates. The brush holders 59 and 60 are provided with central holes in which are slidably mounted the brushes 61—61, said brushes being kept against the commutator by springs such as 62—62 and caps 63—63 serve to keep said springs in place.

Studs 64 and 65 are provided with a central hole in which are slidably mounted brushes such as 66—66. The studs 64 and 65 are secured in holes provided in the bracket 50 and said studs are in all respects similar excepting that the stud 65 is insulated from the bracket 50.

Springs such as 67—67 serve to press the brushes 66—66 against the plates 57 and 58 and screws such as 68—68 serve to retain the springs 67—67 within the studs 64 and 65. Nuts such as 69—69 serve to retain the studs 64 and 65 on the bracket 50. A pulley such as 70 may be mounted upon the shaft 37 for the application of a belt.

The operation of our improved motor is as follows:

A source of electricity, which may furnish either alternating or direct current, is to be connected in any approved manner to the studs 64 and 65. The current of electricity will then flow, (assuming that the stud 64 is attached to the positive pole), through the brush mounted in the stud 64 to the plate 58, (see Fig. 5), from the plate 58 through the brush holder 60 and the brush mounted therein to a commutator section, then through the armature winding to a section or sections on the opposite side of the commutator and through the opposite brush to the brush holder 59, thence to the plate 57, to the insulated stud 65 and back to the source of electricity. This will cause the armature to turn in one direction.

If it is desired that the armature shall rotate in the opposite direction, the brush holders 59 and 60 are to be rotated together with the plates 57 and 58 in a counter clockwise direction from the position shown in Fig. 5 to a position in which the brush mounted in the stud 64 will bear upon the plate 57 and the brush mounted in the stud 65 will bear upon the plate 58. This rotation of the brush holders and plates 57 and 58 will reverse the direction of current through the armature and will reverse the direction of rotation thereof.

I claim:—

1. The combination with an armature provided with a winding, of arcuate unwound field magnets disposed around said armature, the adjacent faces of said magnets being parallel and disposed at an angle to the axis of said armature.

2. The combination with an armature provided with a winding and a commutator, of a plurality of brushes bearing on said commutator and arcuate unwound field magnets disposed around said armature, said field magnets being of uniform radial depth.

3. The combination with an armature provided with a winding and a commutator, of a plurality of brushes bearing on said commutator, arcuate unwound field magnets having adjacent faces forming acute angles with the axis of said armature.

4. The combination with an armature provided with a winding, of arcuate unwound field magnets disposed around said armature, a diamagnetic conducting casing disposed around said field magnets and diamagnetic conducting end rings overlying the ends of said field magnets, and supporting said field magnets, said casing and rings being in electrical connection with said field magnets.

5. The combination with an armature provided with a winding having an odd number of sections, of a commutator having an odd number of segments connected to said sections, brushes even in number bearing upon said segments and arcuate unwound field magnets even in number disposed around said armature.

6. The combination with an armature having a winding, of means for forming a magnetic field around said armature composed of a plurality of laminated paramagnetic parts and a plurality of diamagnetic conducting parts in electrical connection with said paramagnetic parts.

7. The combination with an armature having a winding divided into an odd number of sections, of means for forming a magnetic field around said armature composed of a plurality of laminated paramagnetic parts, and a plurality of diamagnetic conducting parts in electrical connection with said paramagnetic parts, a commutator having an odd number of sections and brushes even in number bearing on said commutator.

8. The combination with an armature provided with a winding and a commutator, of an unwound field magnet, a source of electricity, a pair of brushes bearing on said commutator, a pair of insulating conducting plates for supporting said brushes, a second pair of brushes connected to said source of electricity and each one bearing upon one of said plates, said plates being shiftably mounted to vary the position of said brushes on said commutator and alternate contact with each of said second pair of brushes.

In testimony whereof, we affix our signatures.

GUSTAV BLUMBERG.
JOHN A. BUTKUS.